Figure 1:
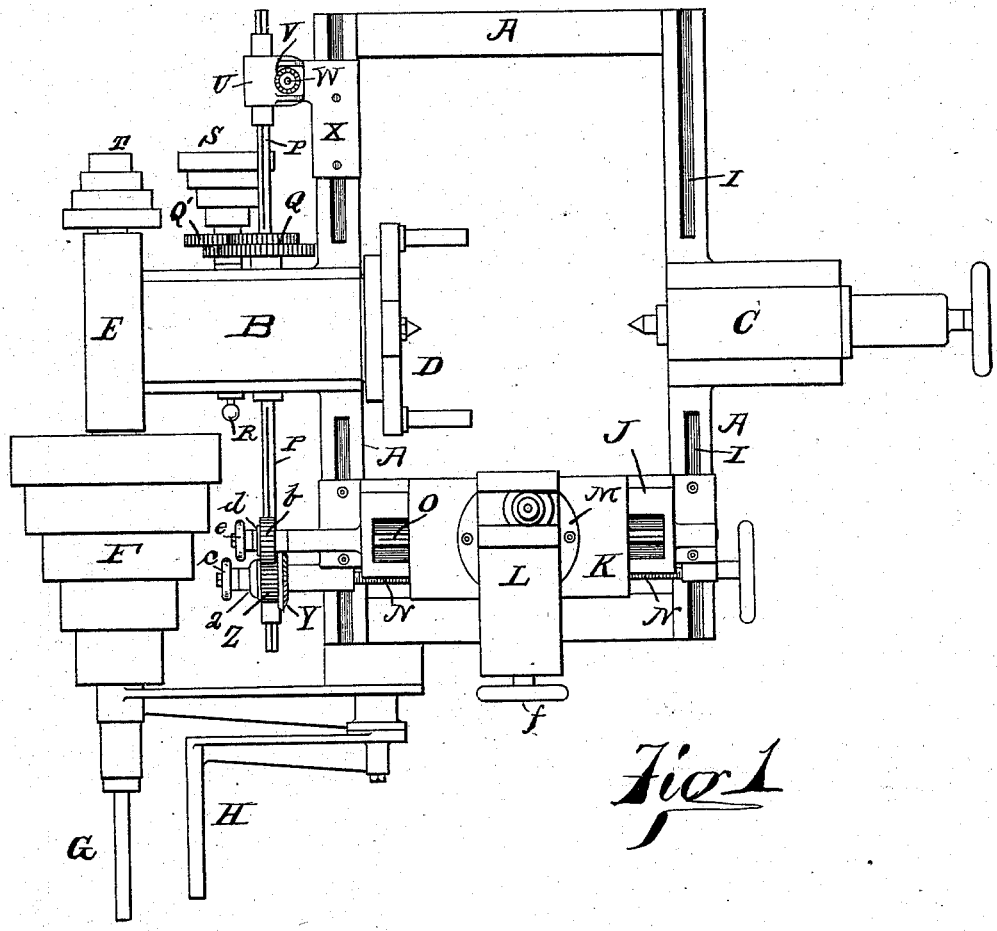

(No Model.)

4 Sheets—Sheet 1.

G. T. REISS.
PULLEY LATHE.

No. 292,948. Patented Feb. 5, 1884.

WITNESSES:
A. Myers
John R. Woods.

George T. Reiss
INVENTOR
by James W. See.
ATTORNEY (No Model.)

4 Sheets—Sheet 2

G. T. REISS.
PULLEY LATHE.

No. 292,948. Patented Feb. 5, 1884.

WITNESSES:
A. Myers
John R. Woods

George T. Reiss INVENTOR
by James W. See
ATTORNEY (No Model.) 4 Sheets—Sheet 3.

G. T. REISS.
PULLEY LATHE.

No. 292,948. Patented Feb. 5, 1884.

WITNESSES:
A. Myers
John R. Woods

George T. Reiss
INVENTOR
by James W. See
ATTORNEY (No Model.) 4 Sheets—Sheet 4.
G. T. REISS.
PULLEY LATHE.
No. 292,948. Patented Feb. 5, 1884.
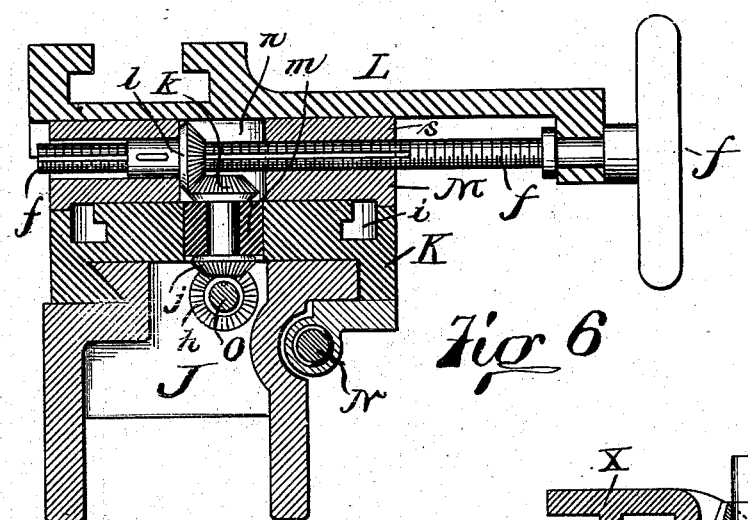
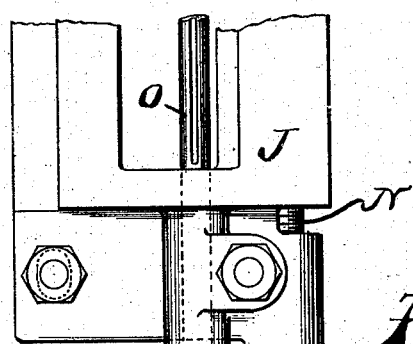
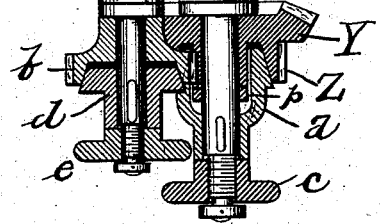
WITNESSES:
INVENTOR
George T. Reiss
by James W. See
ATTORNEY

UNITED STATES PATENT OFFICE.

GEORGE T. REISS, OF HAMILTON, OHIO, ASSIGNOR TO THE NILES TOOL WORKS, OF SAME PLACE.

PULLEY-LATHE.

SPECIFICATION forming part of Letters Patent No. 292,948, dated February 5, 1884.

Application filed May 29, 1883. (No model.)

*To all whom it may concern:*

Be it known that I, GEORGE T. REISS, of Hamilton, Butler county, Ohio, have invented certain new and useful Improvements in Pulley-Lathes, of which the following is a specification.

This invention relates to improvements in lathes for turning the crowning-faces of pulleys. The general arrangement of parts will be understood from the drawings and description, and the parts now claimed as my invention will be found pointed out in the claims.

The machine to which these improvements relate may be said to consist, in a general way, of a horizontal rectangular lathe-bed of a length adapted to the face of the widest pulleys to be turned, and of a width suited to their diameters. This bed is provided with the usual live-spindle and dead-spindle, the live-spindle having a universal driver to engage the pulley-arms, the pulley being carried upon an arbor between the centers of the lathe, as usual. The live-spindle carries on its rear end a worm-gear incased so as to be protected from the dust, and into this worm-gear engages a worm upon a driving-shaft arranged at right angles to the axes of the lathe-centers. On this shaft, at the front of the machine, is the driving-cone for the belt. The outer portion of this shaft is supported by an outer bearing, and an end of the shaft projecting past its bearing forms a socket, into which may be secured variously-sized arbors to support and rotate the pulleys that are to be polished. A rest is pivoted adjustably parallel to the polishing-arbor, so as to be adapted to different diameters of pulleys. While one pulley is being turned, another pulley, placed upon the quickly-running polishing-arbor, may have its rim polished by means of a polishing-stone or polishing-sticks used in connection with the rest just mentioned. On top of the lathe-bed, in front of the central line of the lathe, is placed a tool-rail, on which slides the tool-carrying device. The rail is adjustable upon the bed in and out from the line of the centers, so that it can be adjusted and secured close up to the pulley which is being turned. The rail is supplied with suitable feed-works actuated indirectly from the main driving-shaft. The rail is arranged to be set obliquely with reference to the line of lathe-centers, so as to turn tapers or crowns. A similar rail is arranged upon the rear of the lathe-bed, whereby the pulley may be operated upon simultaneously by tools oppositely disposed. The tool-bearing devices are arranged not only to feed longitudinally with reference to the rail, but also transversely with reference to it, whereby pulley-edges, &c., may be faced off, and this transverse sliding arrangement is adapted to be adjusted angularly with reference to the rails, so that beveled work may be faced.

Figure 2:
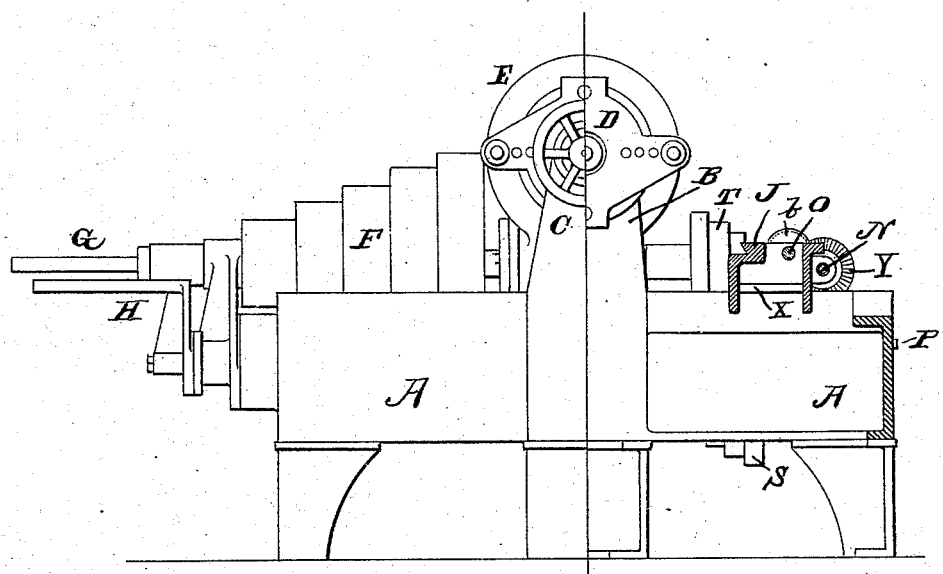
Figure 3:
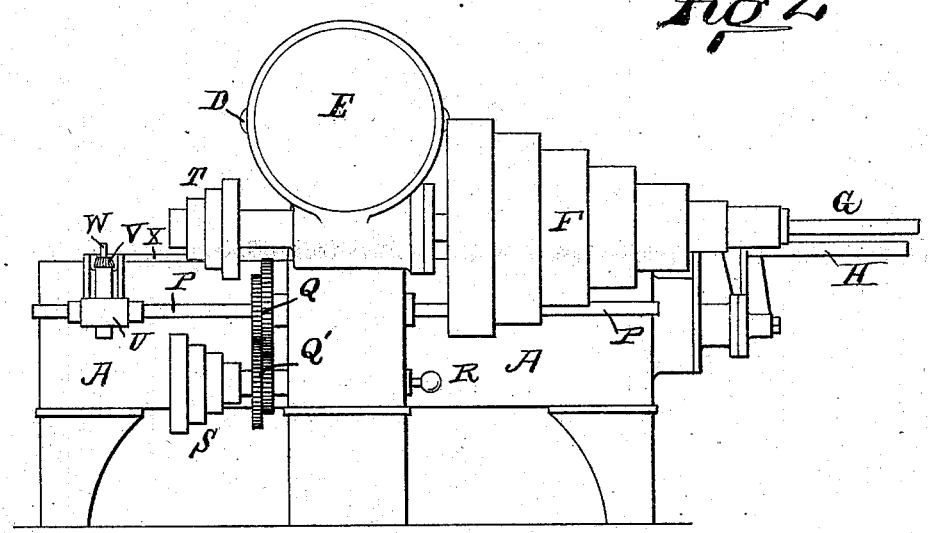
Figure 4:
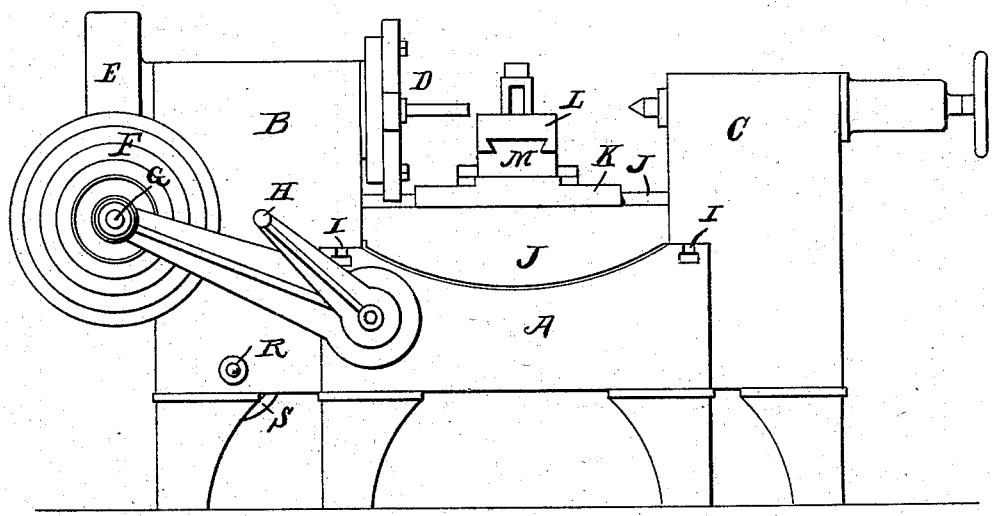
Figure 5:
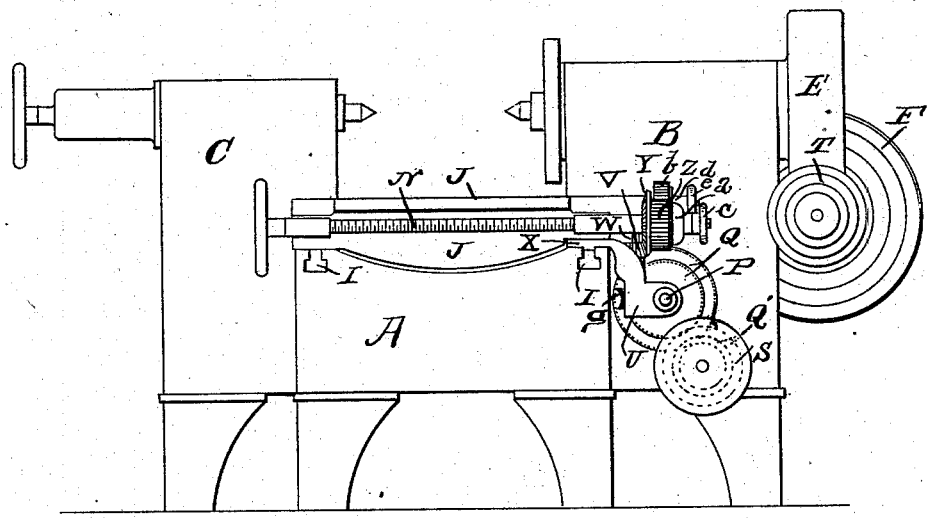

In the accompanying drawings, Figure 1 is a plan of a pulley-lathe embodying my improvements, the rear rail being omitted; Fig. 2, an elevation of the tail-stock end of the same, the tool-rail on the front side being omitted and the portion of the machine to the rear of the centers being shown in vertical section; Fig. 3, an elevation of the head-stock end, the rear rail being omitted; Fig. 4, a front elevation with the front rail omitted; Fig. 5, a rear elevation with driving-plate omitted; Fig. 6, a vertical section of a tool-rail; Fig. 7, a vertical section of a rail-bracket; and Fig. 8, a plan of the left end of a tool-rail, with the friction-feed devices on the end shown in central horizontal section.

In the description the machine will be treated as having the two rails referred to, one to the front and one to the rear of the line of centers of the lathes; but in the drawings one of the rails is omitted where its presence would tend to confuse by covering details.

In the drawings, A represents the rectangular frame or bed of the machine; B, the head-stock; C, the tail-stock; D, the compensating driving apparatus on the spindle; E, the case containing the worm-wheel on the spindle, by which the spindle is driven; F, the driving-cone on the shaft of the worm which drives the said worm-wheel; G, a polishing-arbor secured in the end of the driving-shaft; H, a polishing-rest secured to the front of the lathe-bed. I represents T-slots in the frame by which the tool-rails are secured to the frame; J, the tool-rails bolted to the top of the frame, there being two of the rails in case it is desired to operate on the front and rear of a pulley at the same time; K, the saddle fitted to slide on the rail; L, the tool-slide fitted to be moved across the saddle at any desired angle to the rail; M, the slide-base on which the tool-slide is dovetailed, and which swivels upon the saddle so that the tool-slide can be set to operate at angles to the rail after the manner of the tool-rest of a planing-machine; N, the rail-screw by which the saddle is fed along the rail; O, a splined rail-rod, by which feed-motion is imparted to the tool-slide; P, a splined shaft located alongside the frame to impart motion to the rail-screw and rail-rod; Q, a pair of spur-gears of different diameters fast on the feed-shaft P; Q', a pair of spur-gears on a shaft parallel to shaft P, gearing into gears Q, and provided with a central clutch, by which either of the gears Q' can be locked to its shaft, as is common in cone-gearing; R, a knob in end of the shaft of gears Q', by which said clutch is operated; S, a belt-cone on shaft of gears Q'; T, a cone to match cone S on main worm-shaft; U, a bracket provided with a securing-flange seated on the main frame under the end of the rail, and moving to and from the lathe-centers with the rail, and arranged to slide on feed-shaft P; V, a bevel-pinion carried on a vertical axis in the bracket; W, an extension of the shaft of pinion V, projecting above said pinion into a bearing in the under side of the rail; X, the flange of bracket U, seated on the main frame under the rail, said flange having holes, through which pass the bolts for clamping the rail to the frame, and being also provided with a bottom tongue engaging the T-slot in the frame, whereby the bracket is guided; Y, a bevel-gear loose on the end of rail-screw N, and driven by bevel-pinion V; Z, a spur-gear upon the back of bevel-gear Y; $a$, a friction-clamp in the rear of the bevel-wheel, by which said gear is locked to the screw when desired; $b$, a spur-gear loose on end of rail-rod O, and driven by spur-gear Z; $c$, the hand-nut by which friction-clamp of the rail-screw is engaged; $d$, a friction-clamp in spur-gear $b$, by which said gear is locked to the rail-rod when desired; $e$, the hand-nut by which said friction-clamp is operated; $f$, the screw of the tool-slide; $g$, the worm-wheel on the shaft of bevel-pinion V, inclosed in bracket U, and driven by an inclosed worm on the feed-shaft P; $h$, a miter-gear on rail-rod O, carried in saddle K; $i$, circular bolt slot, by which the slide-base M is enabled to swivel upon the saddle; $j$ and $k$, miter-gears upon a short shaft journaled in the saddle, the lower gear, $j$, gearing with the gear on the rail-rod; $l$, a miter-pinion splined on screw $f$, journaled in slide-base M, and driven by gear $k$; $m$, a bushing in saddle around the short shaft of miter-gears $j$ and $k$; $n$, the cavity in slide-base M, in which the upper set of miter-gears work; $p$, a collar fast on rail-screw N within the friction-clamp $a$, to prevent back movement of bevel-gear Y; $r$, the bearing-hole under rail, in which the end W of the bevel-pinion shaft journals; and $t$ the shaft of worm-wheel $g$ and bevel-pinion V.

The pulley to be turned is placed on a mandrel between the two lathe-centers. The driving device D engages the pulley-arms. A belt on main cone F revolves the pulley through the medium of the worm and worm-gear. The rail, or the two rails, if there be two, is moved up close to the pulley, and then bolted to the bed by bolts passing through the rail ends and flange of the bracket and engaging the slots in the top of the frame. In thus moving the rail the bracket U goes with it, and when the rail is bolted to place the bracket is secured between it and the frame. When turning crowning-pulleys, the rail is set at a slight obliquity to the lathe-centers before being secured. In thus adjusting the rail obliquely it swivels upon the projection W of the shaft of the bevel-pinion V, which projection is journaled in the hole $r$ under the rail, as seen in Fig. 8. The bevel-gear Y is thus always in fair engagement with its pinion. The tongue under the flange X of the bracket serves to maintain the bracket in a square position.

A feed-belt from cone T to cone S gives motion to cone-gears Q', or to whichever of the pair be locked to their shaft by the clutch operated by knob R. The gear thus locked gives motion to gears Q, thence to feed-shaft P, thence to worm-gear $g$, and bevel-pinion V, and bevel-gear Y, and spur-gear $b$. Friction-nut $c$ may cause rail-screw N to be revolved, which will cause the saddle to be fed along the rail. The knob R permits the rate of feed to be altered instantly and while in operation. Further alterations in rate of feed are made by the belt on cones T and S.

Referring to Fig. 8, the friction-nut $e$ permits motion to be imparted to the rail-rod O while the rail-screw N is either revolving or at rest. The centers of the rail-rod and rail-screw are necessarily very close to each other, and, in order to permit the employment of hand-nuts of reasonable diameter, one of the nuts is arranged to project beyond the other, as shown, whereby the one nut may lie with its rim in the neck of the other nut. The thrust of the bevel-pinion Y is taken by the collar $p$, inclosed by the friction-clamp $a$.

Referring to Fig. 6, the slide-screw $f$ is threaded into the slide-base at $s$. The screw is splined, as shown, and is revolved for power-feeding by the miter-gear $l$. By this means a fixed nut and an endwise-moving screw is permissible in a swiveling lathe-rest. The gear $l$ not being fast on the screw, the slide L may be removed from its base by simply backing the screw clear out of its nut. The miter-gear $l$ may then be removed from its bearing, and the bushing $m$ and gears $j$ and $k$ may be lifted out of place. If the slide M be unbolted and removed from the saddle, the gears and bushing may be lifted out.

I claim as my invention—

1. The combination, in a pulley-lathe having its main driving-shaft arranged at right angles to its spindle, of a pair of shifting-rails provided with longitudinally-arranged feed-screws, a splined feed-shaft arranged parallel to the main driving-shaft, mechanism for transmitting motion from the main driving to the splined feed shaft, and suitable gearing adapted to transmit motion from the splined feed-shaft to said feed-screws, substantially as and for the purpose set forth.

2. The combination, in a pulley-lathe having its main driving-shaft arranged at right angles to its spindle, and a pair of shifting-rails provided with feed-screws, of the splined shaft P, provided with gearing suited to transmit motion to the said feed-screws, the gears Q on the splined shaft, the clutch-gears Q', the clutch-mover R, and the belt-cones S and T, substantially as and for the purpose set forth.

3. The combination, in a pulley-lathe, of a pair of shifting-rails provided with longitudinally-arranged feed-screws, bevel-gears loose on said screws, friction-clamps for said bevel-gears, a splined feed-shaft arranged at right angles to the rails, and mechanism for transmitting motion from said splined shaft to said bevel-gears, substantially as and for the purpose set forth.

4. The combination, in a pulley-lathe having a pair of shifting-rails and a splined feed-shaft, of feed-screws on the rails, a bevel-gear on each of the said feed-screws, a bevel-pinion for each of said bevel-gears, mechanism for transmitting motion from said splined shaft to the bevel-pinions, and a bracket fitted to support each pinion and to shift along the splined shaft as the rails are shifted, substantially as and for the purpose set forth.

5. The combination, in a pulley-lathe having shifting-rails with feed-screws driven through bevel-gearing by a splined shaft arranged at right angles to the rails, of the extension W of the shaft carrying the bevel-pinion V, and the rail provided with the bearing-hole $r$ for said extension, substantially as and for the purpose set forth.

6. The combination, in a pulley-lathe having shifting-rails with feed-screws driven through the medium of gearing by a splined feed-shaft arranged at right angles to the rails, of the bracket U, fitted to slide on the splined shaft and provided with flange X, adapted to be clamped between rail and the frame of the lathe, substantially as and for the purpose as set forth.

7. The rail-screw N, bevel-gear Y, friction-clamp $a$, and thrust-collar $p$ within the friction-clamp, combined substantially as specified.

8. The rail-screw and rail-rod, the intermeshing gears thereon, the friction-clamps thereon, and the hand-nuts to the friction-clamps arranged with the rim of one nut located in the neck of the other nut, combined substantially as specified.

GEORGE T. REISS.

Witnesses:
WM. S. GIFFEN,
J. W. SEE.